United States Patent Office 2,906,292
Patented Sept. 29, 1959

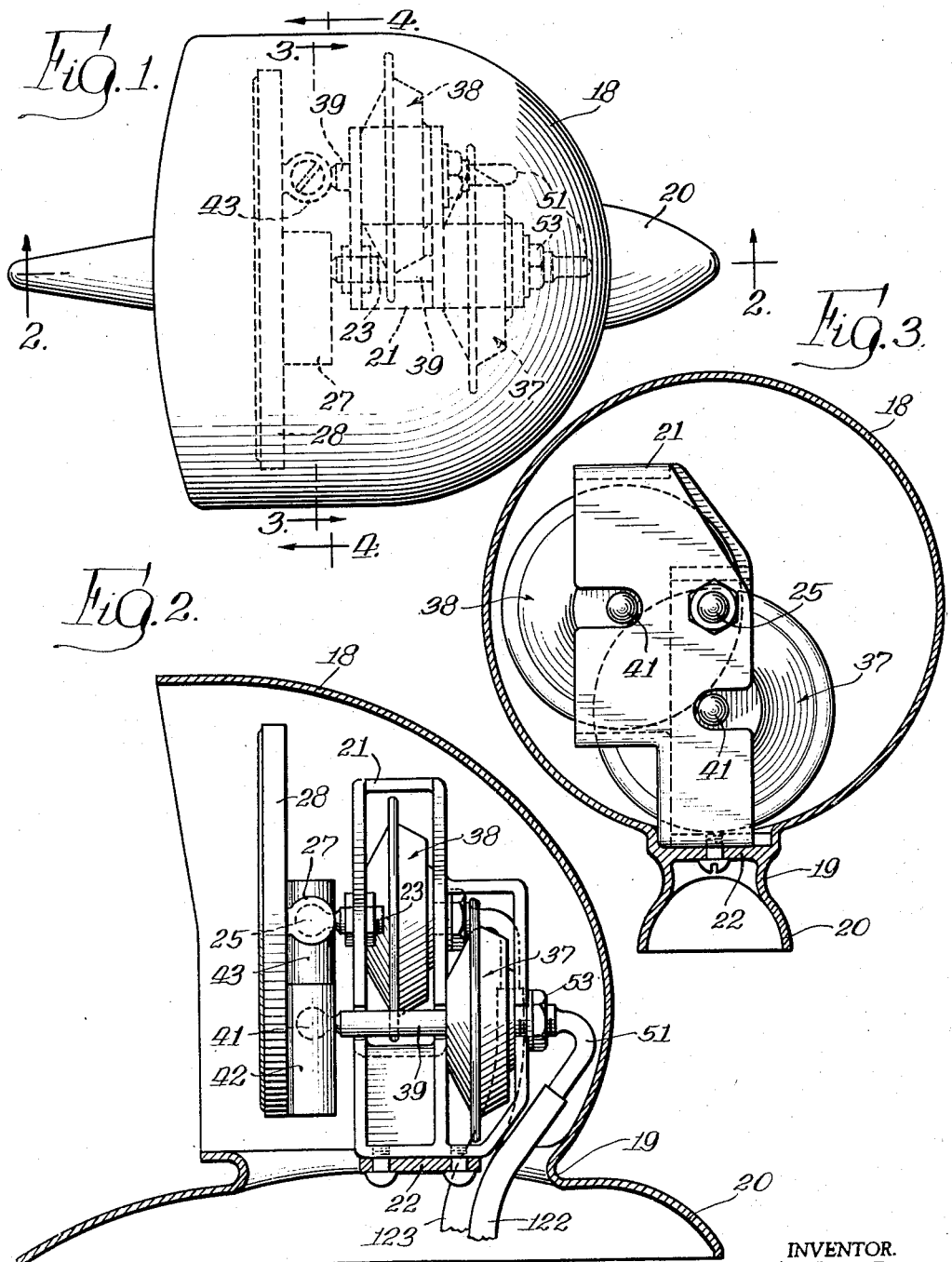

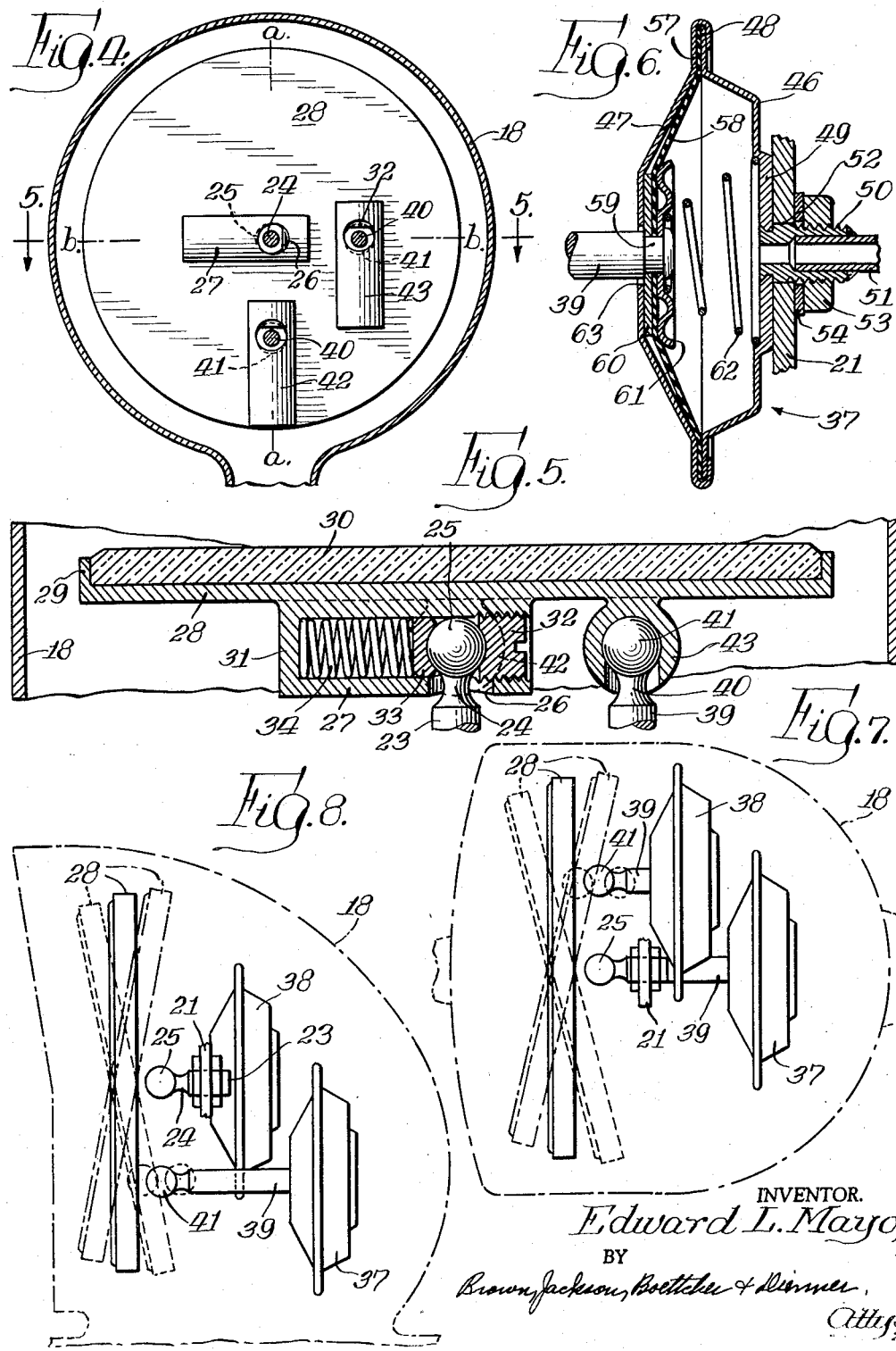

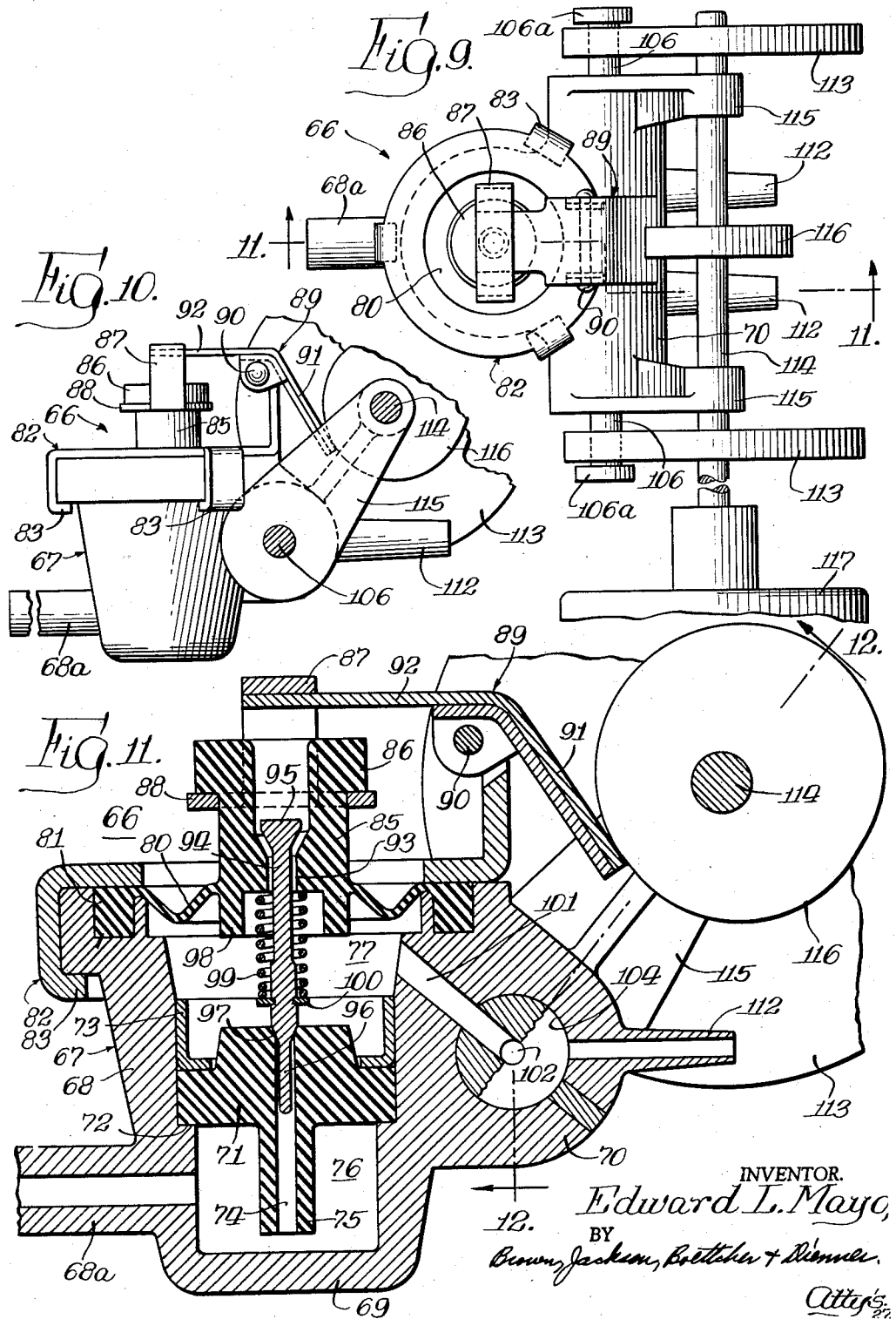

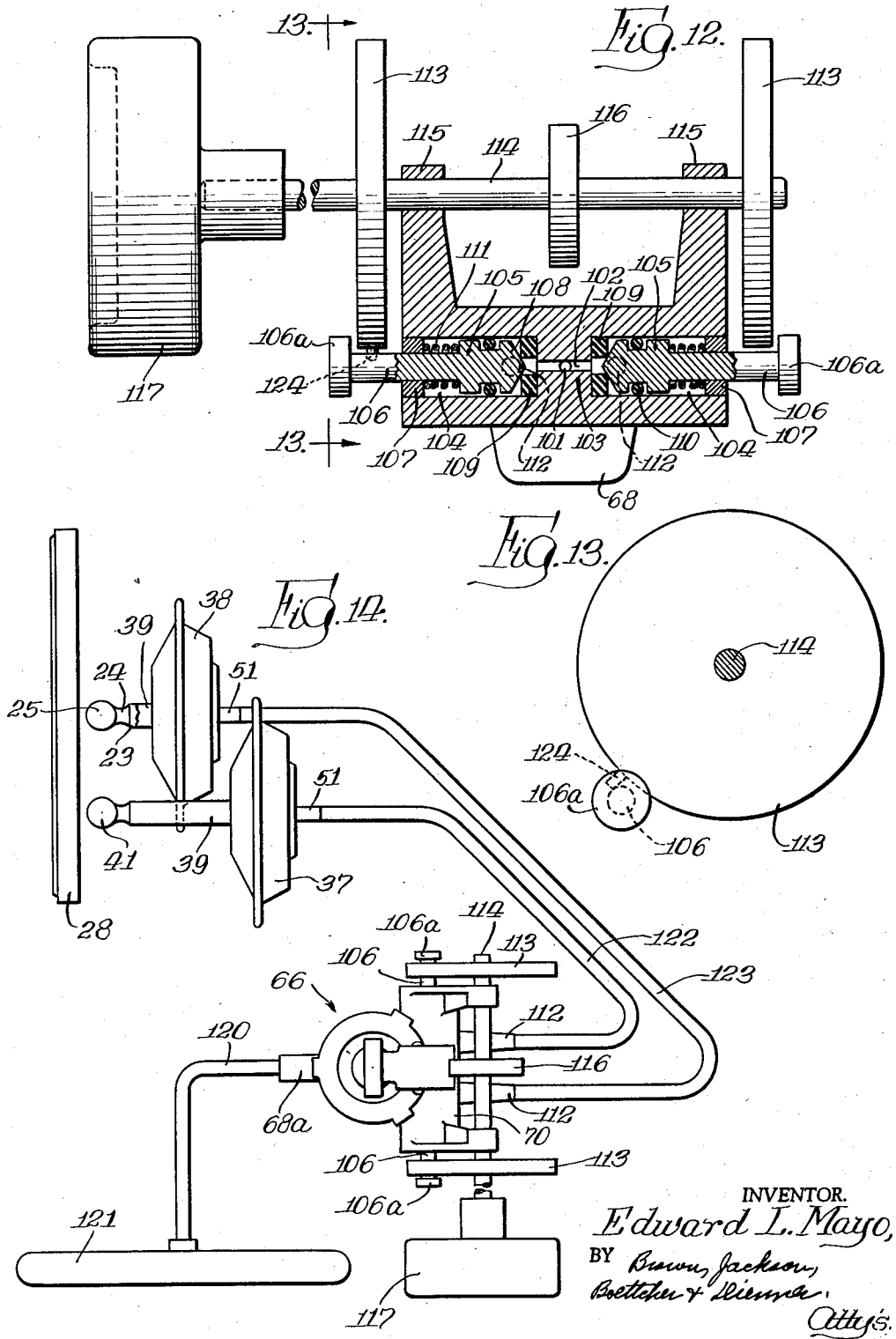

---

2,906,292

REAR VIEW MIRROR AND ADJUSTING MEANS THEREFOR

Edward L. Mayo, Cleveland, Ohio, assignor to The Bishop and Babcock Manufacturing Company, Cleveland, Ohio, a corporation of Ohio Application February 21, 1958, Serial No. 716,685

7 Claims. (Cl. 137—622)

This invention relates to remotely controlled means for effecting desired adjustment of automotive rear view mirrors and analogous devices.

Rear view mirrors for automotive vehicles are well known and extensively used. It is frequencly desirable to change the setting of such a mirror to assure better vision of traffic approaching from the rear. In many cases the mirror is mounted at the exterior of the vehicle and is not readily accessible to the driver, and may, in some instances, be spaced a considerable distance from the driver by being mounted on a support of arm of substantial length. Adjustment of an exterior rear view mirror by hand often may be difficult and if attempted while driving may be dangerous in respect to possible collision.

My invention is directed to means for effecting desired adjustment of rear view mirrors, particularly mirrors disposed exteriorly of automotive vehicles, by an adjustment control mounted on the instrument panel or in any suitable location readily accessible to the driver when seated. To that end I provide simple and efficient means whereby desired adjustment of the mirror may be effected by suction derived from a suitable source, conveniently the intake manifold of the engine of the vehicle, under control of valve means readily accessible to the driver. The means for adjusting the mirror also assures that it will be held in the desired adjustment and enables adjustment in small increments both vertically and horizontally throughout the required range of adjustment. A further and important object of my invention is the provision of comparatively simple, compact and highly efficient control valve means for controlling adjustment of the mirror. While my invention is particularly suitable for adjusting rear view mirrors, in certain respects, it is suitable, in its broader aspects, for adjusting various devices. It will be understood, therefore, that in the following disclosure my invention is shown as used for adjusting a mirror by way of example only and not by way of limitation. Further objects and advantages of my invention will appear from the detail description.

In the drawings:

Figure 1 is a top plan view of the housing and mirror adjusting means therein embodying my invention;

Figure 2 is a sectional view taken substantially on line 2—2 of Figure 1, the mirror and the adjusting motors and the mounting frame therefor being shown in elevation;

Figure 3 is a sectional view taken substantially on line 3—3 of Figure 1;

Figure 4 is a sectional view taken substantially on line 4—4 of Figure 1;

Figure 5 is a sectional view, on an enlarged scale, through one of the ball and socket joints taken substantially on line 5—5 of Figure 4, certain parts being shown in elevation;

Figure 6 is an axial sectional view of one of the mirror adjusting motors, on an enlarged scale, certain parts being shown in elevation;

Figure 7 is a semi-diagrammatic top plan view of the mirror and the adjusting motors therefor and associated parts, showing the mirror in its normal position in full lines, in one laterally adjusted position in dot and dash lines and in its other laterally adjusted position in dotted lines;

Figure 8 is a semi-diagrammatic side view of mirror and the adjusting motors therefor and associated parts, showing the mirror in its normal position in full lines, in its downwardly tilted position in dot and dash lines and in its upwardly tilted position in dotted lines;

Figure 9 is a top plan view of the control valve assembly;

Figure 10 is a side view of the control valve assembly embodying my invention;

Figure 11 is a sectional view, on an enlarged scale, taken substantially on line 11—11 of Figure 9, certain parts being shown in elevation;

Figure 12 is a sectional view taken substantially on line 12—12 of Figure 11;

Figure 13 is a sectional view, taken substantially on line 13—13 of Figure 12, with certain parts broken away for clearness of illustration; and Figure 14 is a diagrammatic view of the mirror and adjusting means therefor embodying my invention.

The mirror and adjusting means therefor of my instant invention is in the nature of an improvement, in certain respects, over the remotely controlled rear view mirror of my copending application, Serial No. 699,096, filed November 26, 1957, as will appear more fully hereinafter.

The mirror, to be described more fully presently, is mounted in a suitably formed rearwardly opening housing 18 having a reduced neck 19 extending from a suitably formed base 20 provided with appropriately disposed openings for reception of securing screws or bolts for mounting the housing upon a suitable support. A suitably formed mounting frame 21 is secured by screws to a bridge element 22 of neck 19. A rearwardly extending stud 23 is secured in frame 21 and extends rearward therefrom and is provided at its rearward end with a reduced neck 24 provided at its outer end with an integral ball 25. Neck 23 extends through an opening 26 in a boss 27 integral with a mirror mounting plate 28 at the front thereof. The plate 28 preferably is in the form of a die casting and is of circular or disc form being provided with a rearwardly extending circumferential flange 29 for retaining a mirror 30 mounted therein and secured in plate 28 in any suitable manner, conveniently by means of a suitable adhesive. The boss 27 is closed at one end by a wall 31 and is interiorly threaded from its other end for reception of a screw plug 32. The ball 25 of stud 23 is confined between the inner end of plug 32 and a cylindrical follower 33 slidable in boss 27 and held in pressure contact with ball 25 by a compression spring 34 confined between follower 33 and end wall 31 of boss 27. The inner end of plug 32 is recessed conformably to ball 25, as is the end of follower 33 remote from wall 31. The ball 25 is thus frictionally gripped between the plug 32 and follower 33 effective for preventing objectionable looseness or play of the mounting plate 21. By turning the plug 32 in appropriate direction the friction grip exerted upon the ball 25 may be adjusted to hold the mounting plate 28 and the mirror 30 in adjustment without presenting objectionable frictional resistance to adjustment thereof. The ball 25 is so disposed that the lengthwise axis thereof and of stud 23 coincides with the center of plate 28. By threading the plug 32 outwardly of boss 27 sufficiently to release the friction grip on ball 25, the latter may be withdrawn through opening 26, which is of slightly greater diameter than ball 25, permitting ready removal and replacement of plate 28 and mirror 30, as may be desired or necessary.

As will be understood from what has been said, the stud 23 and associated parts provide a ball and socket mounting for the plate 28 rendering possible universal adjustment of the latter and, more particularly, adjustment about a transverse vertical axis $a$—$a$ and a transverse horizontal axis $b$—$b$, indicated in Figure 4. Adjustment of the mirror unit comprising plate and mirror 30 is effected by two suction motors 37 and 38, to be described more fully presently, mounted on frame 21. Each of the motors 37 and 38 is provided with a rearwardly extending operating rod 39 to the rearward end of which is attached, by a reduced neck 40, a ball 41. The ball 41 of rod 39 of motor 37 extends into a boss 42 similar to boss 27 and also formed integrally with plate 28, and is frictionally held within boss 42 in the same manner in which ball 25 is held within its boss 27. Referring to Figure 4, it will be noted that the ball 41 in boss 42 is centered on the vertical axis $a$—$a$ of plate 28, and is disposed a material distance below the horizontal transverse axis $b$—$b$. The ball 41 of operating rod 39 of motor 38 extends into a boss 43 similar to boss 42 and is frictionally held therein in the same manner as ball 25 is held in boss 27. Boss 43 also is formed integrally with plate 28 and ball 41 is centered on the transverse horizontal axis $b$—$b$ and disposed a material distance to one side of the transverse vertical axis $a$—$a$. The operating rods 39 of the motors 37 and 38 are yieldingly urged rearward—in a direction toward the mirror unit. When the rods 39 of motors 37 and 38 are midway between their fully projected positions and their fully retracted positions the mirror unit is in its vertical position shown in Figure 2, perpendicular to the lengthwise axis of housing 18, and is securely held in that position by the operating rods 39.

The suction motors 37 and 38 are of the same construction and a description of one thereof, motor 37 for example, will suffice. Referring to Figure 6, motor 37 comprises a base section 46 and a cover section 47 together defining an interior chamber. The base section is of approximately frusto-conical shape and preferably is in the form of a die casting provided at its rearward or larger end with an outwardly extending circumferential flange 48 and, at its forward or smaller end or base with a thickened boss 49 having a central forwardly extending and exteriorly threaded neck 50 from which extends a reduced nipple 51 opening through neck 50 and boss 49 into the chamber within motor 37. The mounting frame 21 is provided with a suitably disposed slot 52 which snugly receives neck 50 for mounting motor 37 on frame 21. A securing nut 53 is threaded on the forward end of neck 50 and seats on a spring washer 54 seating on the forward face of frame 21, effective in cooperation with boss 49 for clamping motor 37 in position on frame 21 with operating rod 39 thereof accurately aligned with boss 42 and with the vertical transverse axis $a$—$a$ of the mirror mounting plate 28. The suction motor 38 is mounted on frame 21 in the same manner as motor 37 but is spaced a short distance rearward thereof, it being noted that the operating rod of motor 37 is of greater length than the rod 39 of motor 38 to compensate for the difference in spacing of the motors from the mirror unit.

The cover section 47 of motor 37 conveniently is formed as a sheet metal stamping and is bent tightly about flange 48 of base section 46 so as to clamp tightly between flange 48 and a flat comparatively narrow circumferential element 57 of cover section 47 the marginal portion of a diaphragm 58 formed of any suitable material, such as a rubberized fabric. The inner or forward end portion of operating rod 39 is reduced in diameter to provide a stud 59 which extends through a flat brass disc 60 seating on the rearward face of diaphragm 58 concentric therewith, the center of diaphragm 58 and a corrugated brass disc 61 seating on the inner or forward face of diaphragm 58, the forward end of stud 59 being peened over effective for tightly securing rod 39 to diaphragm 58 and tightly clamping the central portion of the diaphragm between the discs 60 and 61. A spiral compression spring 62 is confined between boss 49 of base section 46 and disc 61 with its smaller end or base seating on disc 61 concentric with stud 59. The cover section is provided with an opening 63 of somewhat greater diameter than the rod 39 and through which the latter extends.

Connection of the motors 37 and 38 to suction and to atmosphere, to variable extent, is effected by means of the control valve assembly shown more clearly in Figures 9 to 13, inclusive. The control valve assembly 66 comprises a housing 67, preferably in the form of a die casting and including a cylinder 68 closed at its lower end by an end wall 69, and a barrel 70 integral with cylinder 68 and disposed normal thereto. A nipple 68$a$, integral with cylinder 68, opens into the latter a short distance above end wall 69 and, in practice, is connected to a suitable source of suction, such as the intake manifold of the automobile engine, as will be explained more fully presently. A valve seat member 71, formed of suitable material, such as rubber, seats on an interior circumferential shoulder 72 of cylinder 68 above the opening of nipple 68$a$. A flanged retainer 73, suitably secured in cylinder 68, as by having a push fit therein, seats on the upper marginal portion of valve seat member 71 for retaining it in position within the cylinder. The valve seat member 71 is provided with a central restricted passage 74 extending from its upper face and defined in part by a reduced neck 75 extending downward from member 71, the upper portion of passage 74 being slightly flared or of frusto-conical shape to provide a valve seat. The valve seat member 71 divides the cylinder 68 interiorly into a lower primary suction chamber 76 and an upper air inlet chamber 77 with the passage 74 providing a restriction therebetween.

The air inlet chamber 77 is closed at its upper end by a diaphragm 80 formed of any suitable material, such as rubber, having a thickened downwardly extending circumferential flange 81 seating in a corresponding channel in the upper end of cylinder 68. A bracket 82 seats upon flange 81 and is secured to cylinder 68 by depending fingers 83 bent about flange 84 of cylinder 68 and effective for holding the bracket 82 tightly in position with the flange 81 of diaphragm 80 confined under pressure in the channel of cylinder 68 so as to provide an air tight seal therewith. The diaphragm 80 is provided with a central upwardly extending neck 85 of tubular form having at its upper end an outer circumferential flange 86. A stirrup 87 of substantially inverted U-shape extends upwardly above neck 86 and is provided at its lower end with a ring 88 fitting about neck 85 and beneath flange 86 thereof. A lever 89 is pivoted at 90 on bracket 82, this lever comprising a rigid inner arm 91 of laminated construction and an outer arm 92 constituting the outer portion of a spring steel strip of substantial width. The outer arm 92 is resilient and provides, in conjunction with stirrup 87, a yielding connection between lever 89 and neck 85 of diaphragm 80 for moving the latter upward. The neck 85 is tubular, as shown, and is provided with a central opening 93 through which extends a primary valve member 94. The body of valve member 94 is of less diameter than opening 93 and is provided at its upper end with a frusto-conical valve element 95 of materially greater diameter than opening 93 and adapted for cooperation with a valve seat formed in neck 85 and extending upward from opening 93. At its lower end valve member 94 is provided with a reduced downwardly extending finger 96 extending into passage 74 for guiding valve member 94 in its movement and at the upper end of finger 96 the primary valve member is formed to provide a substantially frusto-conical valve element 97 which cooperates with the valve seat at the upper end of passage 74. The tubular neck 98 extends downward from neck 85, as a continuation thereof, and receives the upper end portion of a compression spring 99 disposed about the primary valve member 94 and confined between the lower end of neck 85 and a snap ring 100 engaging in a groove in valve member 94. As will be understood from what has been said, when the diaphragm 80 is in its lower position shown in Figure 11, the valve element or head 95 of the primary valve member 94 is spaced an appreciable distance above its seat at the upper end of opening 93, opening the air inlet chamber 77 to atmosphere and element 97 of valve member 94 is held seated by the compression spring 99 effective for closing the passage 74 and thereby closing the primary suction chamber 76 to the air inlet chamber 77.

The housing 67 is provided with a duct or passage 101 opening from the air inlet chamber 77 into a passage 102 in a central element 103 of barrel 70 and coaxial with the latter. As shown more clearly in Figure 12, the barrel 70 is provided with two secondary chambers 104 extending from each end thereof to the element 103. A valve member 105 is mounted in each of the chambers 104 and is provided with a reduced stem 106 slidable through a plug 107 secured in the outer end of chamber 104 in any suitable manner, conveniently by having a press fit therein. Each of the valve members 105 is provided at its inner end with a substantially frusto-conical head 108 which seats in a valve seat member 109, in the form of a rubber ring seating against the center portion or element 103 of barrel 70 and having an opening aligned with the passage 102. The body portion of valve member 105 is provided with a circumferential groove receiving an O seal ring 110 providing an air tight seal about the valve member, the latter being urged toward seated or closed position by a compression spring 111 disposed about stem 106 and confined between the body of valve member 105 and plug 107. The barrel 70 is further provided with two nipples 112 respectively opening into the secondary chambers 104 adjacent the valve seat members 109. As will be understood from what has been said, when the valve members 105 are in their seated or closed positions shown in Figure 12, the secondary chambers 104 are closed to the air inlet chamber 77.

Stem 106 of each of the secondary valve members 105 is provided at its outer end with a circumferential flange 106a. Two discs 113 are fixed on a shaft 114 rotatably and slidably mounted in two supporting arms 115 extending upwardly from barrel 70 adjacent the ends thereof. When the valve members 105 are in their closed positions shown in Figure 12, the discs 113 are disposed between the ends of barrel 70 and flanges 106a in fairly close proximity to the latter and spaced an appreciable distance from the ends of barrel 70 and the arms 115, discs 113 being of such diameter as to extend to within a short distance of the valve stems 106. By shifting the shaft 114 endwise in appropriate direction either of the secondary valve members 105 may be opened so as to establish communication between the corresponding secondary chamber 104 and the air inlet chamber 77, as will be clear from what has been said. The shaft 114 is further provided with an eccentric cam 116 fixed thereon between the arms 115 and is also provided with a suitable handle or knob 117 secured on one end thereof. The cam 116 contacts arm 91 of lever 89 for adjusting the latter about its pivot 90. When the low point of cam 116 is in contact with arm 91 diaphragm 80 is in its lower position shown in Figure 11 with the air inlet chamber 77 open to atmosphere and closed to the primary suction chamber 76, as previously described.

In practice, the control valve assembly 66 is mounted in a position so as to be readily accessible to the driver of the automobile, conveniently on the instrument panel.

Referring to the diagram of Figure 14, nipple 68a is connected by a conduit 120 to a suitable source of suction, such as the intake manifold 121 of the automobile engine. One of the nipples 112 of the control valve assembly 66 is connected by a conduit 122 to nipple 51 of motor 37 and the other nipple 112 of the control valve assembly 66 is connected by a conduit 123 to nipple 51 of motor 38. It may be assumed, for purposes of description, that the secondary valve members 105 are closed and the motors 37 and 38 are under suction or vacuum of a value to hold the diaphragms 58 thereof midway between their extreme positions in either direction. The mirror unit is then held in its position shown in Figure 2. If it is desired to turn the mirror about the vertical axis a—a in counterclockwise direction, as viewed in Figure 7, shaft 114 is turned so as to raise neck 85 of diaphragm 80 sufficiently to nearly close the opening 93 and is also shifted endwise in proper direction to open the secondary valve member 105 controlling the suction operated motor 38. That is effective for bleeding air to motor 38 with resultant rearward movement of the operating rod 39 of that motor. When rod 39 has been moved to its extreme projected position, disc 60 contacts the rearward wall of cover section 47 of motor 38, at which time the mirror has been turned counterclockwise to its extreme position indicated in dotted lines in Figure 7. In order to turn the mirror in clockwise direction, as viewed in Figure 7, shaft 114 is turned sufficiently to raise neck 85 of diaphragm 80 into contact with valve element 95 of the valve member 94, thereby closing the air inlet chamber 77 to atmosphere, after which shaft 114 is turned a further distance effective for raising the primary valve member 94 and thereby opening the passage 74. The shaft 114 is also shifted endwise in proper direction for opening the secondary valve member 105 controlling the motor 38. In that manner the motor 38 is connected to suction and operating rod 39 thereof is retracted effective for turning the mirror unit in clockwise direction about its vertical axis a—a, the mirror unit being in its adjusted position indicated in dot and dash lines when the operating rod 39 has been retracted to its maximum extent. In the event the mirror unit is turned in either direction about its vertical axis a—a to either a greater or a lesser extent than desired, the desired final adjustment may be effected by bleeding air to motor 38 or by briefly connecting that motor to suction, in a manner which will be obvious from what has been said. Adjustment of the mirror unit about its horizontal pivot axis b—b is accomplished by connecting the motor 37 to atmosphere or to suction, as required, in the same manner as in adjusting the mirror unit by means of the motor 38. In Figure 8 the two extreme positions to which the mirror unit is adjusted about axis b—b are indicated—one by dotted lines and the other by dot and dash lines. When either of the motors 37 and 38 is connected to suction the primary valve member 94 is held raised in open position until the suction or partial vacuum in the air inlet chamber 77 reaches a value such that the atmospheric pressure exerted on the diaphragm 80 is sufficient to cause downward movement of the latter in opposition to the resilient arm 92 of lever 89. At that time diaphragm 80 moves downward to a position closing the primary valve member 94, element 95 remaining seated in neck 85, the motor 37 or 38 then connected to suction being subjected to the same value of suction as obtains in the air inlet chamber 77, then closed to atmosphere and to suction, which suction or partial vacuum is trapped in the motor by closing of the corresponding secondary valve member 105. The partial vacuum or suction thus trapped in the motor is effective, in cooperation with the compression spring 62, for holding diaphragm 58 in its adjusted position and holding the mirror unit in the position to which it has thus been adjusted.

As will be understood from what has been said, by connecting either of the motors 37 or 38 to suction, or to atmosphere, as conditions require, the mirror unit may be adjusted about either of its axes a—a and b—b quickly and accurately and to any desired extent within limits. By mounting the mirror unit centrally for universal movement and disposing the ball and socket connections of the motors 38 and 37 on the horizontal axis b—b and the vertical axis a—a, respectively, interference between the motors is avoided and assurance is had that adjustment of the mirror unit about either of its axes will not effect its position relative to its other axis.

One of the discs 113 is provided with a pin 124, shown more clearly in Figure 13, disposed to contact stem 106 of the corresponding secondary valve member 105 when the low point of cam 116 is in contact with arm 91 of lever 89 and when the high point of cam 116 is in contact with lever arm 91. That is desirable in order that the driver may know when shaft 114 has been turned to either of its extreme positions, though not essential to satisfactory operation of the control valve means.

It will be understood that changes in detail may be resorted to without departing from the field and scope of my invention, and I intend to include all such variations, as fall within the scope of the appended claims, in this application in which the preferred form only of my invention has been disclosed.

I claim:

1. In means for controlling the operation of two suction operated motors, a valve assembly having a primary suction chamber and an air inlet chamber, a primary valve member controlling communication between said primary suction chamber and said air inlet chamber and between the latter and atmosphere, means yieldingly holding said primary valve member in position closing said primary suction chamber to said air inlet chamber and opening the latter to atmosphere, said valve assembly further having two secondary chambers and passages opening from said air inlet chamber into said secondary chambers respectively, two independently operable secondary valve members controlling communication between said secondary chambers respectively and said passages and yieldingly held closed, said valve also having two passages for connection to the two motors and opening into said secondary chambers respectively beyond said first mentioned passages, and means for moving said primary valve member to position opening said primary suction chamber to said air inlet chamber and closing the latter chamber to atmosphere and for optionally and selectively opening said secondary valve members.

2. In means for controlling the operation of two suction operated motors, a valve assembly having a primary suction chamber and an air inlet chamber, a primary valve member controlling communication between said primary suction chamber and said air inlet chamber and between the latter and atmosphere, means actuated by atmospheric pressure for yieldingly holding said primary valve member in position closing said primary suction chamber to said air inlet chamber and opening the latter to atmosphere, said valve assembly further having two secondary chambers and passages opening from said air inlet chamber into said secondary chambers respectively, two independently operable secondary valve members controlling communication between said secondary chambers respectively and said passages and yieldingly held closed, said valve also having two passages for connection to the two motors and opening into said secondary chambers respectively beyond said first mentioned passages, and means for yieldingly moving said primary valve member to position opening said primary suction chamber to said air inlet chamber and closing the latter chamber to atmosphere and for optionally and selectively opening said secondary valve members.

3. In means for controlling the operation of two suction operated motors, a valve assembly having a primary suction chamber and an air inlet chamber with a restriction therebetween, a diaphragm closing the outer end of said air inlet chamber exposed to atmosphere and provided with an air admission opening, a primary valve member controlling said restriction and opening extending through the latter and provided at its outer end with a valve element of greater cross sectional area than said opening, means cooperating with said diaphragm for yieldingly holding said primary valve member in position closing said restriction with said valve element spaced from said opening for admission of air to said air inlet chamber, said valve assembly further having two secondary chambers and passages opening from said air inlet chamber into said secondary chambers respectively, two independently operable secondary valve members controlling communication between said secondary chambers respectively and said passages and yieldingly held closed, said valve also having two passages for connection to the two motors and opening into said secondary chambers respectively beyond said first mentioned passages, and means for yieldingly moving said diaphragm outward effective for moving said primary valve member to position opening said restriction and closing said opening and for optionally and selectively opening said secondary valve members.

4. In means for controlling the operation of two suction operated motors, a valve assembly having a primary suction chamber and an air inlet chamber with a restriction therebetween, a diaphragm closing the outer end of said air inlet chamber exposed to atmosphere and provided with an air admission opening, a primary valve member controlling said restriction and opening extending through the latter and provided at its outer end with a valve element of greater cross sectional area than said opening, means cooperating with said diaphragm for yieldingly holding said primary valve member in position closing said restriction with said valve element spaced from said opening for admission of air to said air inlet chamber, said valve assembly further having two secondary chambers and passages opening from said air inlet chamber into said secondary chambers, two secondary valve members controlling communication between said secondary chambers respectively and said passages and yieldingly held closed, an operating lever having yielding connection to said diaphragm for moving it outward, an operating shaft mounted for rotation and endwise movement in either direction, cooperating means carried by said shaft and lever effective for moving said diaphragm outward responsive to turning of said shaft and thereby moving said primary valve member to position opening said retriction and closing said opening, and cooperating means carried by said shaft and secondary valve members for optionally and selectively opening the latter responsive to endwise movement of said shaft.

5. In means for controlling the operation of two suction operated motors, a valve assembly comprising a cylinder and an attached barrel substantially normal to said cylinder, the latter having a lower primary suction chamber and an upper air inlet chamber with a restriction therebetween and said barrel having two secondary chambers, a diaphragm closing the upper end of said air inlet chamber exposed to atmosphere and provided with an air inlet opening, a primary valve member controlling said restriction and opening extending through the latter and provided at its upper end with a valve element of greater cross sectional area than said opening, means cooperating with said diaphragm for yieldingly holding said primary valve member in position closing said restriction with said valve element spaced above said opening for admission of air to said air inlet chamber, said cylinder and barrel having passages opening from said air inlet chamber into said secondary chambers respectively, two secondary valve members controlling communication between said secondary chambers respectively and said passages and yieldingly held closed, an operating lever pivoted intermediate its ends with one arm yieldingly connected to said diaphragm for moving it upward, an operating shaft mounted above said barrel substantially parallel therewith and for rotation and endwise movement in either direction, a cam member fixed on said shaft disposed to contact the other arm of said lever for moving said diaphragm upward and thereby moving said primary valve member to position opening said restriction and closing said opening responsive to turning of said shaft, and cooperating means carried by said shaft and secondary valve members for optionally and selectively opening the latter responsive to endwise movement of said shaft.

6. In means for controlling the operation of two suction operated motors, a valve assembly comprising a cylinder and an attached barrel substantially normal to said cylinder, the latter having a lower primary suction chamber and an upper air inlet chamber with a restriction therebetween and said barrel having two secondary chambers, a diaphragm closing the upper end of said air inlet chamber exposed to atmosphere and provided with an air inlet opening, a primary valve member controlling said restriction and opening extending through the latter and provided at its upper end with a valve element of greater cross sectional area than said opening, means cooperating with said diaphragm for yieldingly holding said primary valve member in position closing said restriction with said valve element spaced above said opening for admission of air to said air inlet chamber, said cylinder and barrel having passages opening from said air inlet chamber into said secondary chambers respectively, two secondary valve members controlling communication between said secondary chambers respectively and said passages and yieldingly held closed, an operating lever pivoted intermediate its ends with one arm yieldingly connected to said diaphragm for moving it upward, an operating shaft mounted above said barrel substantially parallel therewith and for rotation and endwise movement in either direction, an eccentric cam member fixed on said shaft disposed to contact the other arm of said lever for raising and lowering said diaphragm responsive to turning of said shaft in opposite directions, said cam member having a low point at which said diaphragm is in lowered position with said primary valve member in position closing said restriction with said valve element disposed above said opening and a high point at which said diaphragm is in raised position with said primary valve member in position opening said restriction and closing said opening, and cooperating means carried by said shaft and secondary valve members for optionally and selectively opening the latter responsive to endwise movement of said shaft.

7. In means for controlling the operation of two suction operated motors, a valve assembly comprising a cylinder and an attached barrel substantially normal to said cylinder, the latter having a lower primary suction chamber and an upper air inlet chamber with a restriction therebetween and said barrel having two secondary chambers, a diaphragm closing the upper end of said air inlet chamber exposed to atmosphere and provided with an air inlet opening, a primary valve member controlling said restriction and opening extending through the latter and provided at its upper end with a valve element of greater cross sectional area than said opening, means cooperating with said diaphragm for yieldingly holding said primary valve member in position closing said restriction with said valve element spaced above said opening for admission of air to said air inlet chamber, said cylinder and barrel having passages opening from said air inlet chamber into said secondary chambers respectively, two secondary valve members controlling communication between said secondary chambers respectively and said passages and yieldingly held closed, an operating lever pivoted intermediate its ends with one arm yieldingly connected to said diaphragm for moving it upward, supporting arms secured to and extending upward from said barrel adjacent the ends thereof, an operating shaft slidably and rotatably mounted in said arms above and substantially parallel with said barrel, an eccentric cam member fixed on said shaft disposed to contact the other arm of said lever for raising and lowering said diaphragm responsive to turning of said shaft in opposite directions, said cam member having a low point at which said diaphragm is in lowered position with said primary valve member in position closing said restriction with said valve element disposed above said opening and a high point at which said diaphragm is in raised position with said primary valve member in position opening said restriction and closing said opening, and cooperating means carried by said shaft and secondary valve members for optionally and selectively opening the latter responsive to endwise movement of said shaft.

References Cited in the file of this patent
UNITED STATES PATENTS

| | | |
|---|---|---|
| 1,270,163 | Jesurun et al. | June 18, 1918 |
| 1,398,291 | Arbuckle | Nov. 29, 1921 |
| 1,711,565 | Hatfield et al. | May 7, 1929 |
| 1,824,062 | Winter | Sept. 22, 1931 |
| 2,218,936 | Melown | Oct. 22, 1940 |
| 2,334,031 | Rappl | Nov. 9, 1943 |
| 2,368,628 | Bates | Feb. 6, 1945 |
| 2,450,481 | May | Oct. 5, 1948 |
| 2,656,764 | Johnson | Oct. 27, 1953 |
| 2,691,990 | Ashton | Oct. 19, 1954 |